US008032609B2

(12) United States Patent
Rogers et al.

(10) Patent No.: US 8,032,609 B2
(45) Date of Patent: Oct. 4, 2011

(54) DYNAMIC ENDPOINT AGGREGATOR FOR WEB SERVICES

(75) Inventors: Adam Rogers, Waterloo (CA); Michael Shenfield, Richmond Hill (CA)

(73) Assignee: Research In Motion Limited, Waterloo, Ontario (CA)

(*) Notice: Subject to any disclaimer, the term of this patent is extended or adjusted under 35 U.S.C. 154(b) by 542 days.

(21) Appl. No.: 11/423,295

(22) Filed: Jun. 9, 2006

(65) Prior Publication Data
US 2007/0288636 A1 Dec. 13, 2007

(51) Int. Cl.
*G06F 15/16* (2006.01)
(52) U.S. Cl. ........ 709/217; 709/220; 709/223; 709/228; 709/243
(58) Field of Classification Search .................. 709/203, 709/246, 224, 219, 242, 218, 217, 223, 227
See application file for complete search history.

(56) References Cited

U.S. PATENT DOCUMENTS

| | | | | |
|---|---|---|---|---|
| 7,185,342 | B1* | 2/2007 | Carrer et al. .................. | 719/313 |
| 7,457,870 | B1* | 11/2008 | Lownsbrough et al. ...... | 709/224 |
| 2004/0068586 | A1* | 4/2004 | Xie et al. ..................... | 709/246 |
| 2004/0215700 | A1 | 10/2004 | Shenfield | |
| 2005/0038867 | A1 | 2/2005 | Henderson et al. | |
| 2005/0232210 | A1* | 10/2005 | Karaoguz et al. ............. | 370/338 |
| 2006/0168122 | A1* | 7/2006 | Acharya et al. ............... | 709/219 |
| 2006/0179150 | A1* | 8/2006 | Farley et al. .................. | 709/228 |
| 2007/0192706 | A1* | 8/2007 | Bruce et al. ................... | 715/742 |
| 2007/0195815 | A1* | 8/2007 | Turner et al. .................. | 370/465 |
| 2008/0263225 | A1* | 10/2008 | Nadalin et al. ................ | 709/242 |
| 2009/0024701 | A1* | 1/2009 | Flurry et al. .................. | 709/203 |

FOREIGN PATENT DOCUMENTS

| | | |
|---|---|---|
| EP | 1 569 418 | 8/2005 |
| EP | 1569418 A1 | 8/2005 |
| WO | 2004072885 A1 | 8/2004 |
| WO | WO 2004/072885 | 8/2004 |

OTHER PUBLICATIONS

European Search Report for EP Application No. 06115256.7.
European Patent Office, "Communication Pursuant to Article 96(2) EPC" for corresponding EP Application No. 06 115 256.7, dated Sep. 26, 2007.

* cited by examiner

*Primary Examiner* — Djenane Bayard

(57) ABSTRACT

A dynamic endpoint aggregator aggregates dynamic endpoints of requested Web services for efficiently delivering the Web services to a Web service client. The client communicates to the aggregator a plurality of SOAP requests each having a SOAP header containing a redirect URL for the aggregator in turn to access each of the requested Web services. Web service data is aggregated by the aggregator and then efficiently communicated to the client, which is particularly useful when wireless clients access Web services because of the limited bandwidth available over the wireless link. The aggregator also handles dynamic endpoints by dynamically resetting all endpoints of requested Web services without burdening the wireless link.

14 Claims, 4 Drawing Sheets

DYNAMIC ENDPOINT AGGREGATOR FOR WEB SERVICES

CROSS-REFERENCE TO RELATED APPLICATIONS

This is the first application filed for the present invention.

TECHNICAL FIELD

The present invention relates generally to telecommunication networks and, in particular, to methods and systems for efficiently accessing Web services.

BACKGROUND OF THE INVENTION

The term "Web service" typically refers to a modular application that can be invoked through the Internet. The consumers of Web services are typically other software applications that communicate, usually over HTTP (Hyper Text Transfer Protocol), using XML (extensible Markup Language) standards including SOAP (Simple Object Access Protocol), WSDL (Web Services Description Language), and UDDI (Universal Description, Discovery, and Integration). In other words, a "Web service" is an application hosted on a Web server that provides information and services to other network applications using the HTTP and XML protocols. Conceptually, a Web service can be understood as an URL-addressable library of functionality that is entirely independent of the consumer and stateless in its operation.

A conventional technique for accessing Web services is shown in FIG. 1. The client sends individual SOAP requests to each Web service and then receives individual SOAP responses from each Web service. In the example shown in FIG. 1, the client establishes three separate and direct communication sessions with each of the three Web services, which burdens the communication link between the client and the data network hosting the Web services. Furthermore, if dynamic endpoints have to be reset, for example for load balancing, the dynamic endpoints need to be reset at the client, which also burdens the communications link between the client and the data network. For wireless clients accessing Web services, this is particularly problematic since the wireless link typically has limited bandwidth.

Accordingly, it would be highly desirable to provide a system and method that enables a client to efficiently access Web services.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
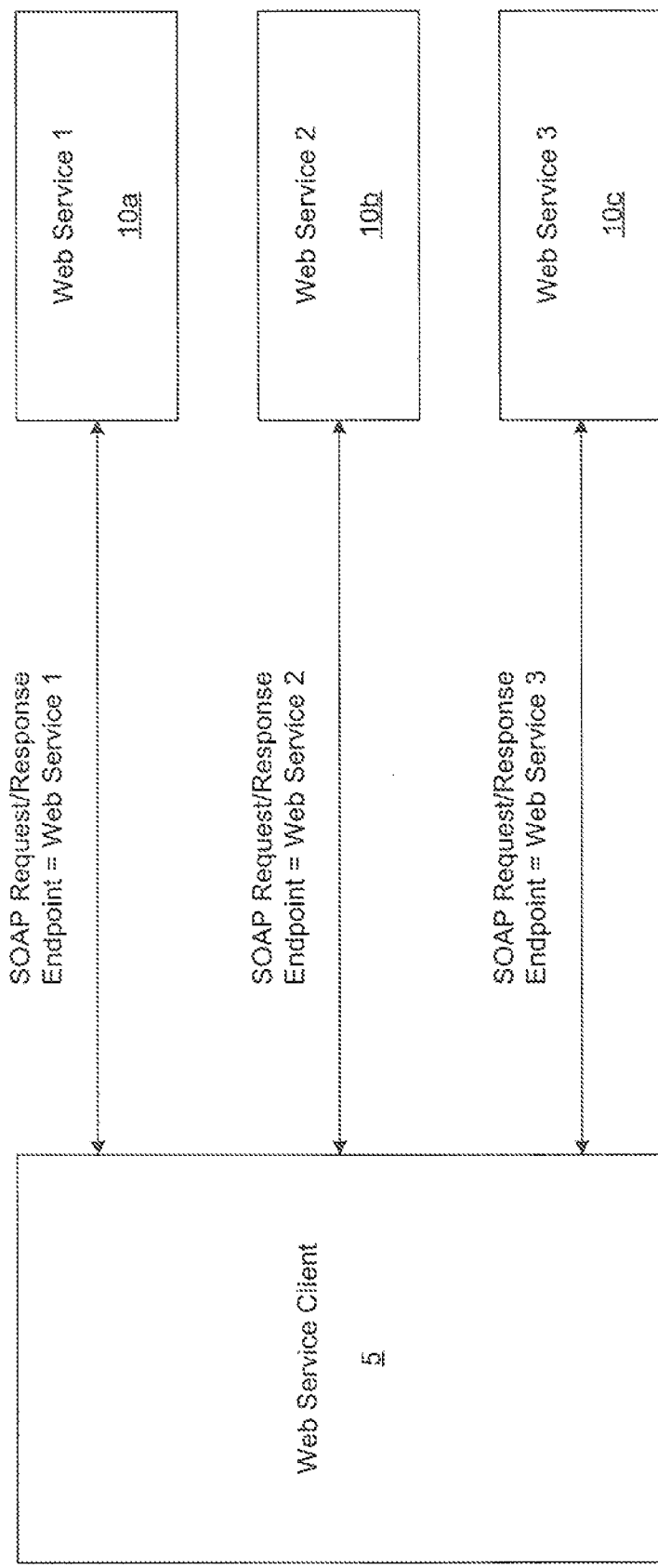
FIG. 1 is a schematic illustration of a Web service client accessing a plurality of Web services in accordance with the prior art.

An object of the present invention is to enable a client to efficiently access Web services.

Thus, an aspect of the present invention provides a system for aggregating dynamic endpoints for efficiently delivering web services to a client. The system includes a data network communicatively connected to the client enabling the client to send and receive data through the data network; a plurality of Web services connected to the data network enabling the client to access the Web services through the data network; and an aggregator communicatively connected between the client and the Web services to mediate between the client and the Web services, the aggregator being capable of receiving Web service requests from the client for requested Web services, accessing the requested Web services, receiving Web services data from the Web services, aggregating the Web services data by reformulating the Web services data to suit the client, and then communicating the Web services data to the client. The aggregator is capable of dynamically resetting endpoints of requested Web services in a manner that is entirely transparent to the client.

In one embodiment, the client runs on a wireless communications device hosted by a wireless network connected to the data network via an application gateway that mediates data traffic between the wireless network and the data network whereby the aggregator aggregates dynamic endpoints of all Web services requested by the client and efficiently communicates Web services data to the client over a wireless connection.

In another embodiment, the client establishes a communications session with the aggregator by setting the aggregator as a fixed endpoint for the client. The communications session can include sending a SOAP request to the aggregator containing a SOAP header including a redirect URL of a Web service for instructing the aggregator to access the requested Web service at that URL.

In another embodiment, the aggregator is co-resident with the application gateway.

In yet another embodiment, the aggregator is itself a Web service.

A further aspect of the present invention provides a method of aggregating dynamic endpoints for efficiently delivering web services to a client. The method includes the steps of receiving a plurality of Web service requests from the client at an aggregator connected to a data network to which the requested Web services are also connected, each Web service request including a respective Web service endpoint for accessing the requested Web service, establishing a communications session between the aggregator and each Web service endpoint to access each requested Web service, aggregating the requested Web services at the aggregator by reformulating the Web service data to create an aggregation of Web services suited to the client, and delivering the aggregation of Web services to the client.

In one embodiment, aggregating the plurality of Web services is performed within an application gateway that is connected between a wireless network and the data network for mediating data traffic between the wireless network and the data network.

The step of receiving a plurality of Web service requests from the client can include the step of receiving SOAP requests from the client, each SOAP request having a SOAP header containing a redirect endpoint for a requested Web service enabling the aggregator to access the requested Web service.

The step of establishing a communications session between the aggregator and each Web service endpoint can include the step of sending a SOAP request and receiving a SOAP response to and from each of the requested Web service endpoints.

In another embodiment, the step of aggregating Web service data from each of the plurality of Web services at the aggregator to create an aggregation of Web services includes the step of reconstituting the aggregation of Web services as a single Web service accessible directly by the client.

In yet another embodiment, the method includes the step of dynamically resetting an endpoint of a Web service at the aggregator without relaying the dynamically reset endpoint to the client. Thus, endpoints for Web services are dynamically reset by the aggregator without burdening the communications link between the client and the aggregator. This is particularly useful for wireless clients where dynamically resetting endpoints on the client side, as is done in the prior art, can strain the available wireless bandwidth.

A method and system are capable of aggregating dynamic endpoints for efficiently delivering Web services to a client such as, but not limited to, a wireless client. As is known in the art, an endpoint is the address of a specific server instance on a host system. An endpoint can be static or dynamic. A static endpoint is a pre-assigned, stable address that a server uses every time it runs. In contrast, a dynamic endpoint is assigned at runtime for each protocol sequence the server is using. Representative embodiments of this new technology are described below, by way of example only, with reference to FIGS. 2-4.

Figure 2:
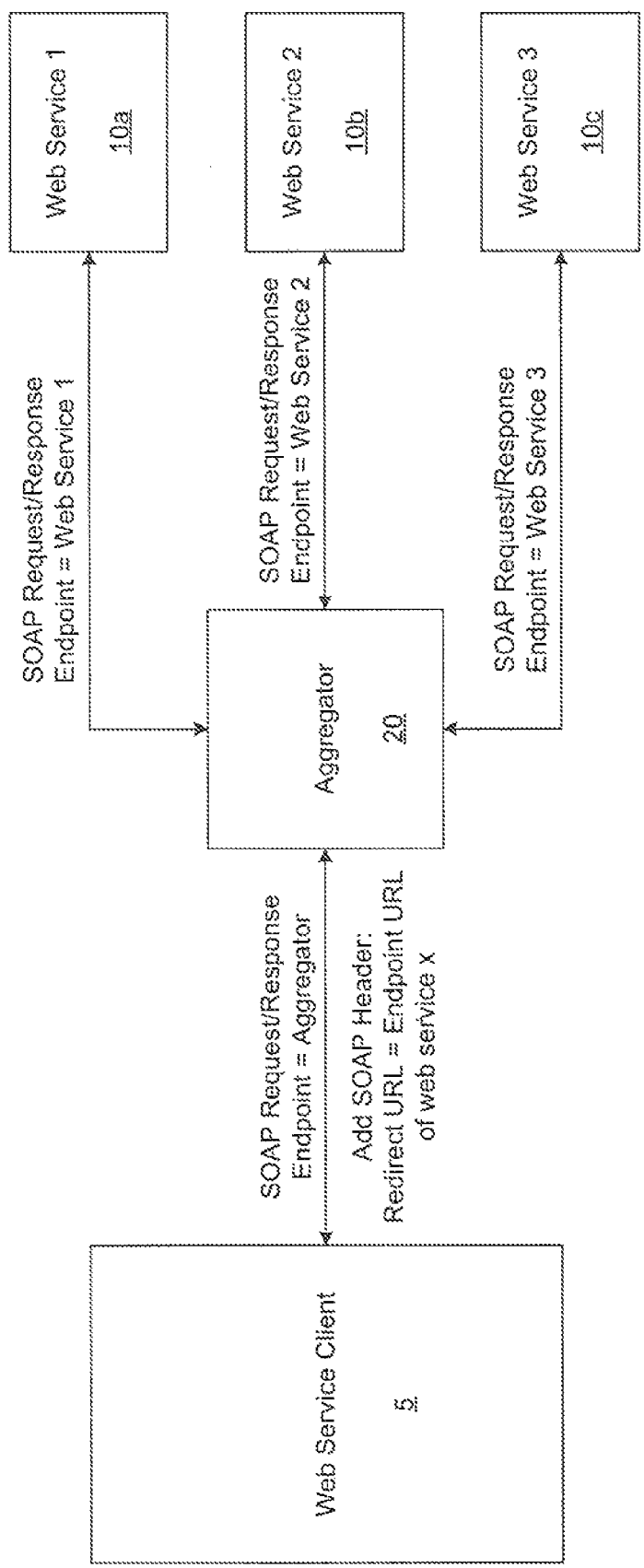
FIG. 2 is a schematic illustration of a server-side aggregator system for aggregating dynamic endpoints in accordance with an embodiment of the present invention.

FIG. 2 is a schematic illustration of a server-side aggregator system for aggregating dynamic endpoints in accordance with an embodiment of the present invention. As shown in FIG. 2, a Web service client 5 (hereinafter simply the "client") accesses Web services 1, 2 and 3 via an aggregator 20 (or "dynamic endpoint aggregator"). As will be elaborated below, the aggregator mediates between the client 5 and the Web services 10a, 10b and 10c by receiving the client's requests for Web services and then accessing the requested Web services, aggregating the Web services, and then communicating the aggregated Web services in an efficient manner to the client. In the preferred embodiment, the client 5 runs on a wireless platform, and therefore has a wireless communication link with the aggregator 20 via a wireless network. The aggregator 20 therefore aggregates the data from each of the Web services so as to minimize the burden on the wireless communication link.

As shown in FIG. 2, in the preferred embodiment, the client 5 sends SOAP requests to the aggregator 20 and receives SOAP responses from the aggregator 20 in reply. A communication session is thus established between the client 5 and the aggregator 20. In this communication session, the client 5 has set the aggregator's address as a fixed endpoint. As shown in FIG. 2, the client 5 adds a SOAP header to the SOAP request that contains a redirect URL corresponding to a requested Web service. The aggregator 20 reads the SOAP header, i.e. extracts the endpoint URL (or redirect URL) for the requested Web service, and then accesses the requested Web service. As shown in FIG. 2, the aggregator 20 establishes individual communication sessions with each of the requested Web services, exchanging SOAP requests and SOAP responses with each Web service. For each communication session or "web connection", the aggregator 20 sets an endpoint to be the address of the requested Web service.

As is known in the art, SOAP, or Simple Object Access Protocol, is a lightweight XML-based protocol for invoking Web services and exchanging structured data and type information in a decentralized, distributed environment, e.g. on the World Wide Web (WWW). SOAP is a protocol that uses an envelope for defining a framework to describe what is in a message and how to process it, a set of encoding rules for expressing instances of application-defined data types, and a convention for representing remote procedure calls and responses.

Three Web services 10a, 10b, 10c are illustrated in FIG. 2, but it should be understood that a greater or lesser number of Web services could be involved. As is understood by those of ordinary skill in the art, a Web service is an Internet-hosted application, i.e. a collection of protocols and standards used for exchanging data between applications. Software applications written in various programming languages and running on various platforms can use Web services to exchange data over computer networks like the Internet by using open standards. The applications are able to communicate, usually over HTTP (Hyper Text Transfer Protocol), using XML (extensible Markup Language) standards including SOAP (Simple Object Access Protocol), WSDL (Web Services Description Language), and UDDI (Universal Description, Discovery, and Integration).

Figure 3:
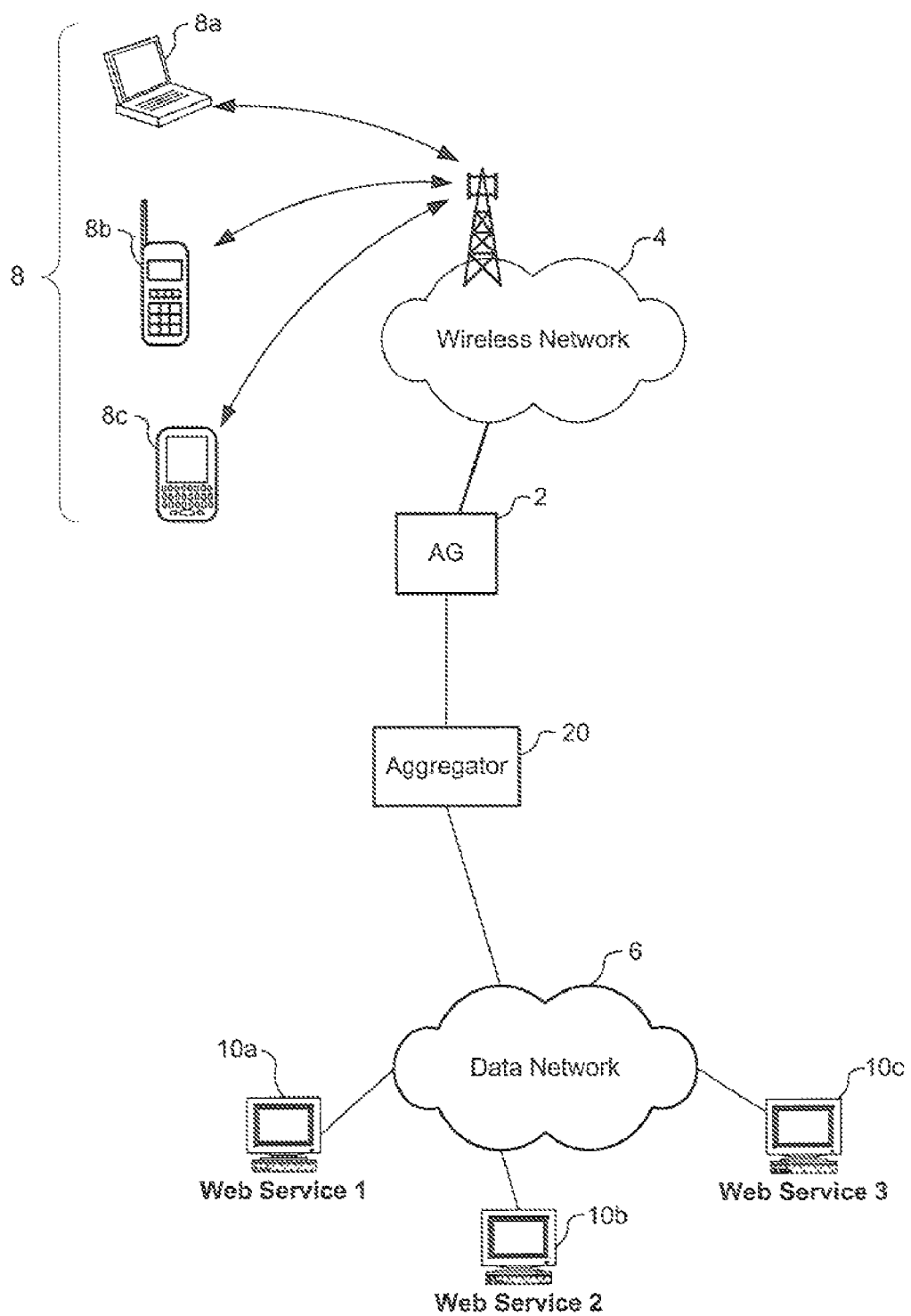
FIG. 3 is a schematic layout of a network incorporating an aggregator for aggregating dynamic endpoints to efficiently deliver web services to a client in accordance with a preferred embodiment of the present invention.

Referring now to FIG. 3, a system in accordance with a preferred embodiment of the present invention generally includes a wireless network 4 hosting a plurality of wireless communication devices 8 (also known as "terminal devices"). As illustrated, the wireless communication devices 8 can be any of a wide variety of wireless devices including but not limited to wireless-enabled laptop computers 8a, mobile or cellular telephones 8b, wireless-enabled PDAs 8c, self-service kiosks (not shown) and two-way pagers (not shown).

As shown in FIG. 3, an Application Gateway (AG) 2 is coupled between the wireless network 4 and a data network 6, such as for example, the Internet. The AG 2 generally operates to mediate data traffic flowing between wireless communication devices 8 connected to the wireless network 4 and Web services 10a, 10b, 10c accessible through the data network 6 in the manner described in Applicant's co-pending United States Patent Publications Nos. 2004/0215700 and 2004/0220998, both of which are incorporated herein by reference.

Each of these wireless communication devices 8, or terminal devices, generally includes a microprocessor connected to an RF section for wireless communications, a memory (at least a portion of which will normally be non-volatile), and a user interface (UI) including a display and one or more user input devices (UID), e.g. a keyboard, thumb-wheel, stylus, microphone, etc. The microprocessor operates under software control to provide the functionality of the terminal device. Preferably, the software is designed on a layered model, in which a runtime environment (RE) translates between application software, such as an e-mail application, and the native machine-language of the terminal device to control the terminal device hardware, and communicate with Web services or other data services. This layered software model, and the manner in which it operates, is known from Applicant's co-pending United States Patent Publications Nos. 2004/0215700 and 2004/0220998.

As described in Applicant's co-pending United States Patent Publications Nos. 2004/0215700 and 2004/0220998, operation of the AG 2 enables, for example, a web-browser application executing in a terminal device to communicate with Web services or other Internet data services offered through the data network 6. The wireless client may, for example, access and download data or files from Web services connected to the data network 6. The AG 2 mediates between the terminal device and the Web service by receiving the data from the Web service, stripping out extraneous data that would otherwise encumber the wireless link, and formatting (or "repackaging") the data for wireless-optimized transmission to, and presentation on, the terminal device 8.

In addition to the AG 2, the system includes an aggregator 20, as shown in FIG. 3. The aggregator 20 can be co-resident with the AG 2 or it can be disposed as a separate server, as shown. As will be explained below, the aggregator 20 and the application gateway (AG) 2 collaborate synergistically to handle data traffic from Web services to the client running on a wireless platform such as one of the wireless communication devices 8 illustrated in FIG. 3.

As shown in FIG. 3, the aggregator 20 is communicatively connected between the client (running on one of the wireless platforms 8) and the Web services 10a, 10b, 10c to mediate between the client and the Web services. The aggregator 20 is thus capable of receiving Web service requests from the client for requested Web services, accessing the requested Web services, receiving Web services data from the Web services, aggregating the Web services data and then efficiently communicating the Web services data to the client.

The aggregator 20 enables a client to efficiently access Web services in two respects. First, the aggregator allows a client to access and aggregate several unrelated Web services. In other words, a Web service client can be built using Web service data from several different endpoints using the technique shown in FIG. 2. Instead of aggregating the endpoints on the client side, e.g. on the wireless platform, the aggregator 20 does all the work, whereby the client only communicates with the aggregator 20 (acting as an aggregated, or "centralized", Web service) instead of with several different Web services. Specifically, the aggregator 20 can receive SOAP requests, each request including a SOAP header containing a redirect URL for one of a plurality of requested Web services. For each requested Web service, the aggregator 20 can establish a communication session with the requested Web service, access the data from the requested Web service, and then aggregate this Web service data with the Web service data from other requested Web services. In the preferred embodiment, the aggregator 20 is itself a Web service that is constituted by the aggregation of other Web services.

Second, the aggregator 20 is capable of dynamically resetting endpoints for Web services without burdening the communication link to the client. As is known in the art, many Web services use dynamic endpoints, for example for load balancing or for other purposes. A "server-side" application (i.e. the Web service aggregator in accordance with embodiments of the present invention) can dynamically reset endpoints on behalf of the client, thus obviating the need for the client application to dynamically reset the endpoints. This economizes bandwidth on the communication link between the client and the data network. This is particularly useful to clients running on wireless platforms, because the dynamic endpoints would otherwise have to be reset at the client, which uses up the limited bandwidth of the wireless link. Therefore, the aggregator 20 alleviates the burden on the wireless link, thereby enabling the wireless client to efficiently access Web services.

Although the aggregator 20 is particularly useful for clients running on wireless platforms where transport optimization is needed to avoid unduly taxing the limited bandwidth of the wireless link, this aggregator can also be used for any wired client seeking to efficiently access Web services (e.g. a non-wireless networked computer, workstation or other computing device wired directly to the data network).

A further benefit is that none of the memory and processing resources of the wireless communication device are devoted to the tracking of these dynamic endpoints since all dynamic endpoints for all requested Web services are reset exclusively by the aggregator 20.

To recapitulate, therefore, the aggregator 20 enables a client to efficiently access Web services in two respects. First, the aggregator 20 can aggregate several different Web services in response to a client sending SOAP requests containing SOAP headers that carry redirect URLs for the requested Web services. Since the client only establishes communication with the aggregator, this minimally burdens the communication link between the client and the data network. Secondly, when a Web service requires resetting a dynamic endpoint (e.g. for load balancing), the aggregator resets the dynamic endpoint without burdening the communication link with the client. The aggregator 20 is especially beneficial for wireless clients because the available wireless bandwidth is typically strained when accessing Web services wirelessly.

Moreover, for wireless clients, the AG 2 collaborates with the aggregator 20 by receiving the aggregated Web service data, stripping out extraneous data (if any) and unusable functionalities (where applicable), and then repackaging and "tailoring" this data for the client application running on the wireless communication device. Thus, while the aggregator efficiently accesses and aggregates the requested Web services and handles resetting of dynamic endpoints, the AG tailors the aggregated Web services data for the client running on wireless communication device. Together, the aggregator and AG enable a wireless communication device to access Web services in a highly efficient manner.

Another aspect of the present invention provides a method of aggregating dynamic endpoints for efficiently delivering Web services to a client. With reference to the flowchart shown in FIG. 4, the method includes a step of receiving a plurality of Web service requests from the client at an aggregator connected to a data network to which the requested Web services are also connected (at step 30). Each Web service request includes a respective Web service endpoint for accessing the requested Web service. In other words, the aggregator then determines endpoints for each requested Web service (at step 32).

Figure 4:
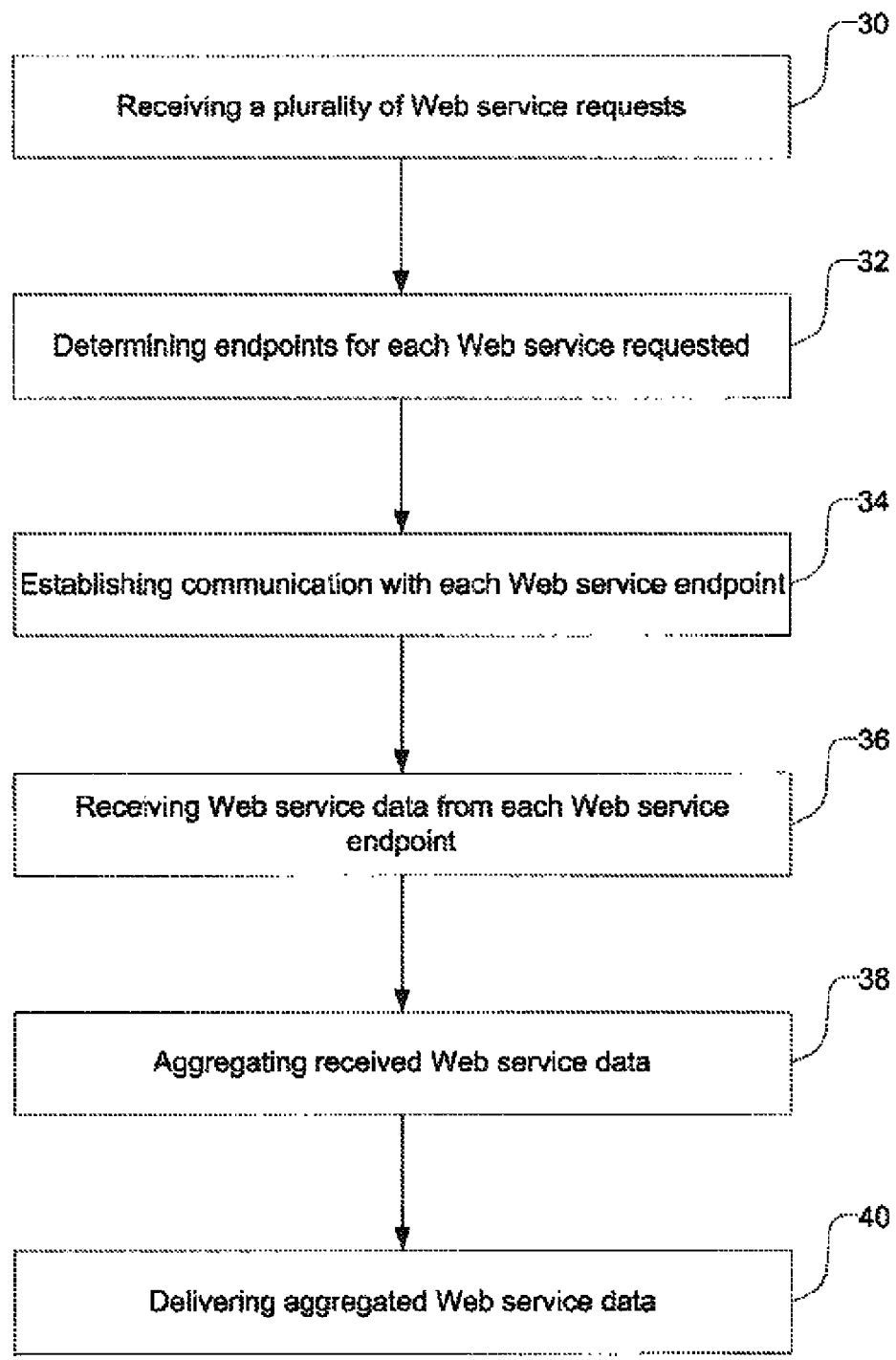
FIG. 4 is a flowchart showing steps in a method of aggregating dynamic endpoints in accordance with an other aspect of the present invention.

As shown in FIG. 4, the method further includes steps of establishing a communications session between the aggregator and each Web service endpoint (at step 34). The aggregator then receives Web service data from each requested Web service (at step 36). Web service data from each of the plurality of Web services is then aggregated at the aggregator to create an aggregation of Web services suited to the client (at step 38). In other words, the resulting aggregation is optimized for (or at least well suited to) the display and processing capabilities of the client device. Reformulating the Web services data can include stripping out extraneous data (e.g. to eliminate certain functionalities that are not supported by the client device) or tailoring the Web services data for the client device. Reformulation of requested Web services thus renders the aggregated Web services more efficient for transmission. Accordingly, the aggregated Web services can be "efficiently" delivered to the client (at step 40).

For example, the step of receiving a plurality of Web service requests can include receiving SOAP requests from the client, each SOAP request having a SOAP header containing a redirect endpoint for a requested Web service enabling the aggregator to access the requested Web service.

In one embodiment, the step of aggregating Web service data from each of the plurality of Web services at the aggregator includes the step of reconstituting the aggregation of Web services as a single Web service accessible directly by the client.

The embodiments of the invention described above are intended to be exemplary only. The scope of the invention is therefore intended to be limited solely by the scope of the appended claims.

A portion of the disclosure of this patent document may contain material that is subject to copyright protection. The copyright owner has no objection to the facsimile reproduction by anyone of the patent document or patent disclosure, as it appears in the Patent and Trademark Office patent file or records, but otherwise reserves all copyright.

We claim:

1. A system for aggregating dynamic endpoints for efficiently delivering Web services to a client, the system comprising:
   a data network communicatively connected to the client enabling the client to send and receive data through the data network;
   a plurality of Web services connected to the data network enabling the client to access the plurality of Web services through the data network; and
   an aggregator communicatively connected between the client and the Web services to mediate between the client and the plurality of Web services, the aggregator being arranged to receive a Web service request from the client for two or more requested Web services, each Web service request comprising, for each of the two or more requested Web services, a respective Web service endpoint for accessing a respective requested Web service, access the two or more requested Web services at each Web service endpoint, receive Web services data from the two or more requested Web services, aggregate the Web services data by reformulating the Web services data from the two or more requested Web services into an aggregation of Web services data suited to the client, and then communicate the aggregation of Web services data to the client,
   wherein the aggregator is arranged to dynamically reset the Web service endpoints received in the Web service request without relaying the dynamically reset endpoints to the client.

2. The system as claimed in claim 1 wherein the client runs on a wireless communications device hosted by a wireless network connected to the data network via an application gateway that mediates data traffic between the wireless network and the data network whereby the aggregator aggregates dynamic endpoints of all Web services requested by the client and efficiently communicates Web services data to the client over a wireless connection.

3. The system as claimed in claim 2 wherein the aggregator is co-resident with the application gateway.

4. The system as claimed in claim 1 wherein the client establishes a communications session with the aggregator by setting the aggregator as a fixed endpoint for the client.

5. The system as claimed in claim 4 wherein the communications session comprises a SOAP request to the aggregator containing a SOAP header including a redirect URL of a Web service for instructing the aggregator to access the requested Web service at that URL.

6. The system as claimed in claim 1 wherein the aggregator comprises a Web service.

7. The system as claimed in claim 1 wherein the aggregator dynamically resets endpoints of requested Web services, wherein the dynamic resets are entirely transparent to the client.

8. A method of aggregating dynamic endpoints for efficiently delivering Web services to a client, the method comprising steps of:
   receiving a Web service request for two or more requested Web services from the client at an aggregator connected to a data network to which the two or more requested Web services are also connected, the Web service request comprising, for each of the two or more requested Web services, a respective Web service endpoint for accessing a respective requested Web service;
   establishing a communications session between the aggregator and each Web service endpoint to access each of the two or more requested Web services;
   receiving Web services data from the two or more requested Web services;
   aggregating the Web services data at the aggregator by reformulating the Web services data to create an aggregation of Web services data suited to the client; and
   delivering the aggregation of Web services data to the client,
   wherein the aggregator is arranged to dynamically reset the Web service endpoints received in the Web service request without relaying the dynamically reset endpoints to the client.

9. The method as claimed in claim 8 wherein the step of aggregating the Web services data is performed within an application gateway that is connected between a wireless network and the data network for mediating data traffic between the wireless network and the data network.

10. The method as claimed in claim 8 wherein the step of receiving a plurality of Web service requests from the client comprises the step of receiving SOAP requests from the client, each SOAP request having a SOAP header containing a redirect endpoint for a requested Web service enabling the aggregator to access the requested Web service.

11. The method as claimed in claim 8 wherein the step of establishing a communications session between the aggregator and each Web service endpoint comprises the step of sending a SOAP request and receiving a SOAP response to and from each of the requested Web service endpoints.

12. The method as claimed in claim 8 wherein the step of delivering the aggregation of Web services data to the client comprises converting the aggregated Web services data into a format efficient for transmission over a wireless link.

13. The method as claimed in claim 8 wherein the step of aggregating Web service data from each of the plurality of Web services at the aggregator to create an aggregation of Web services comprises the step of reconstituting the aggregation of Web services as a single Web service accessible directly by the client.

14. The method as claimed in claim 8 further comprising the step of dynamically resetting an endpoint of a Web service at the aggregator without relaying the dynamically reset endpoint to the client.

* * * * *